United States Patent
Craig et al.

(10) Patent No.: US 6,598,037 B1
(45) Date of Patent: Jul. 22, 2003

(54) DATA TABLE OBJECT INTERFACE FOR DATASTORE

(75) Inventors: Robert M. Craig, Bellevue, WA (US); William D. Devlin, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/360,442

(22) Filed: Jul. 26, 1999

(51) Int. Cl.⁷ ............................................. G06F 17/30
(52) U.S. Cl. ................................. 707/1; 707/3; 707/10
(58) Field of Search ........................... 707/10, 2, 1, 101, 707/103, 4, 205; 709/101, 203; 711/4, 112

(56) References Cited

U.S. PATENT DOCUMENTS

| | | | |
|---|---|---|---|
| 5,485,617 A | | 1/1996 | Stutz et al. |
| 5,517,645 A | | 5/1996 | Stutz et al. |
| 5,655,148 A | * | 8/1997 | Richman et al. ............... 707/3 |
| 5,689,703 A | | 11/1997 | Atkinson et al. ........... 395/614 |
| 5,706,505 A | | 1/1998 | Fraley et al. |
| 5,794,038 A | | 8/1998 | Stutz et al. |
| 5,822,580 A | | 10/1998 | Leung ........................ 395/614 |
| 5,842,018 A | | 11/1998 | Atkinson et al. ........... 395/700 |
| 5,911,068 A | | 6/1999 | Zimmerman et al. |
| 6,003,097 A | * | 12/1999 | Richman et al. ............... 707/3 |
| 6,085,030 A | | 7/2000 | Whitehead et al. .... 395/200.33 |

OTHER PUBLICATIONS

A Case for Meta–Internetworking: Projecting CORBA Meta–data into Com, "Smith et al., Proceedings of the 1998 Conference on Technology of Object–Oriented Languages, pp. 242–253, Nov. 23–26, 1998, IEEE 98TB100271".
Dale Rogerson, *Inside COM*, 1997; Chapter 1,; pp. 116–126.
Distributed Computing Monitor vol. 13, No. x; *COM+ The Future of Microsoft's Component Object Model*, Featured Report by David Chappell; pp. 3–17.

* cited by examiner

*Primary Examiner*—Jean M. Corrielus
(74) *Attorney, Agent, or Firm*—Merchant & Gould P.C.

(57) ABSTRACT

A data table object module which is a component based object that provides configuration information to a caller in response to a request for information. The present invention also relates to an implementation that exposes a standard interface for callers desiring to access the data as part of an overall catalog management system or schema. The data table interface is substantially separate from the program code related to the catalog schema to thus enable the creation and addition of new data table objects to a catalog system with out recompiling the entire catalog management system program code.

26 Claims, 6 Drawing Sheets

DATA TABLE OBJECT INTERFACE FOR DATASTORE

TECHNICAL FIELD

The invention relates generally to object-oriented data processing and system management, and more particularly to accessing configuration information from a datastore.

BACKGROUND OF THE INVENTION

Many executable software programs or applications require access to system-wide, configuration-type information at times when the application is being installed or modified on a computer system, i.e., at configuration time and at the time the application is executed to perform its intended function, i.e., at run time. Typically, the application needs to access configuration information related to available resources on the local computer system and through connected computers across a computer network. These resources include available software and hardware tools as well as available services offered by the system that improve the functionality of the program within the overall system.

Accessing this information is done through direct access to the "registry" located on each computer system. The registry is simply a place to store and read configuration information. Meanwhile, a management system also provides services through embedded logic in response to the configuration data requests. The services may relate to such items as security, validation, roles, etc. as well as network communication conflict management.

The services are typically exploited through an attribute-based programming scheme which allows program developers to specify the services and resources required by an application by setting properties (or "attributes") of each application or component rather than implementing or calling those services directly from the implementation code. Attributes include a particular set of configuration information that is made available to various callers in an attribute-based environment.

Even in an attribute-based programming environment, the application desiring data and services must know where the information comes from in the system. Moreover, the program typically must know the format that the information is stored in to be able to access the information. In existing approaches, the system registry has been used to store configuration data for a particular machine. However, in existing approaches, a programmer was required to access and manipulate registry information directly, introducing undesirable program complexity and exposing the registry to corruption by improper programming. Moreover, the distribution of configuration information among multiple datastores (i.e., in addition to the registry) and data formats is not accommodated by existing approaches. This is particularly true if the location and format of data is expected to evolve over time. In current approaches, the implementation code itself must be altered in order to handle location and format changes to configuration information. Accordingly, existing approaches lack location and format independence that can provide the desired flexibility for storage and access to configuration information in a computer system.

It is with respect to these and other considerations that the present invention has been made.

SUMMARY OF THE INVENTION

The present invention relates to a data table object which is a component based object that provides configuration information to a caller in response to a datastore-independent request for information. The present invention also relates to an implementation that exposes a standard interface for callers desiring to access the data as part of an overall catalog management system or schema. The data table interface is substantially separate from the program code related to the catalog schema to thus enable the creation and addition of new data table objects to a catalog system with out recompiling the entire catalog management system program code.

In accordance with preferred aspects of the present invention, a data table object is created that provides access for a caller to configuration data wherein the data table is a COM object that accesses data from a predetermined datastore and provides a common interface enabling the caller to access the data. Datastore interaction code in the data table object enables interaction with the datastore and a cache which is populated by the datastore interaction code with information from the datastore, preferably a table of configuration data referred to a data level table. Following creation of the data table object, the caller gains a pointer to a requested interface. The interface, since the data table is a COM object, provides methods to the caller that allow the caller to read the data in the cache and provide desired data modifications. The caller operates on the cache information, not the datastore information directly.

In accordance with preferred aspects, the present invention relates to a method of presenting configuration information stored in a datastore to a computer process caller within a computer system having memory. The method comprises the steps of populating the memory with configuration information in response to a request from the caller; providing the caller with a cursor to the configuration information located in the memory; and providing a standardized command set for the caller to enable the caller to the obtain configuration information values from the memory. Preferably, the configuration information is presented in to the caller in tabular form, which may require some conversion.

In accordance with other preferred aspects there are several interfaces providing various methods including: Populate Cache, Update Store, Update Read Cache, Restart Row, Get Next Row, Move To Row By Identity, Move to Row by Index, Move to New Row, Delete Row, Set Row, Set Column, Get Column, and Clone Cursor.

The data table object is instantiated by a table dispenser and provides the caller the ability to populate a read cache with a catalog table using Populate Cache. The caller gains access to the populated read cache through a cursor that enables the user to navigate the table using the following methods: Restart Row, Get Next Row, Move To Row By Identity, Move to Row by Index and Move to New Row. The data table object also enables the user to update the catalog table using a write cache and the methods Update Store, Update Read Cache and modify the catalog table using Delete Row, Set Row, Set Column, Get Column. Additionally, the data table preferably supports multiple cursors through the method Clone Cursor.

These and various other features as well as advantages which characterize the present invention will be apparent from a reading of the following detailed description and a review of the associated drawings.

DETAILED DESCRIPTION OF THE INVENTION

An embodiment of the present invention includes a data table object for accessing configuration data located in a predetermined "datastore." In the preferred embodiment, data table implementations are employed in a catalog environment which controls and manages the interaction between application programs requesting configuration information and services, i.e., callers. Moreover, the preferred catalog environment or schema exploits an attribute-based programming model to provide particular services to callers.

Figure 1:
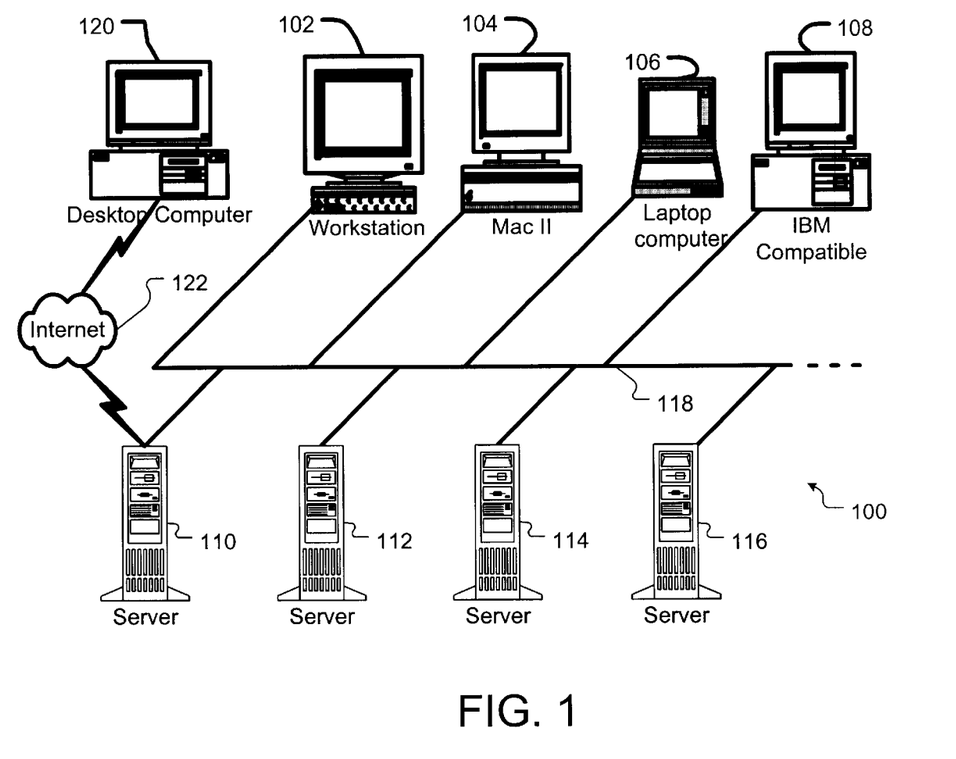
FIG. 1 is a pictorial representation of a suitable client-server computing environment in which an embodiment of the present invention may be implemented showing both clients and servers.

A computing environment 100 in which an embodiment of the present invention may be implemented is shown in FIG. 1. Client computer systems 102, 104, 106 and 108 are connected to server computer systems 110, 112, 114 and 116 by a network connection 118. Additionally, client computer 120 is connected to server computer 110 via a communications link, such as the Internet 122. Since the server 110 is connected via the network connection 118 to the other servers 112, 114 and 116, the client computer 120 is also connected and may access information on the other servers 112, 114 and 116.

The client computer systems 102, 104, 106, 108 and 120 operate using at least some of the information and processes available on at least one of the servers 110, 112, 114 and 116. Additionally, the clients 102, 104, 106, 108 and 120 can each access the various shared resources provided by any other computer on the network 100. Each client is a complete, stand-alone personal computer and offers the user a full range of power and features for running applications. The clients 102, 104, 106 and 108, however, may have different operational features as compared to the other clients, but each client is able to communicate with the servers and other clients via the common interface 118.

The servers 110, 112, 114 and 116 are either personal computers, minicomputers, or a mainframes that provide traditional strengths offered by minicomputers and mainframes in a time-sharing environment: data management, information sharing between clients, and sophisticated network administration and security features. The client and server machines work together to accomplish the processing of the application being used. Working together in this manner increases the processing power and efficiency related to each independent computer system shown in FIG. 1.

Typically, the client portion of an application executed in the distributed network 100 is optimized for user interaction whereas the server portion provides the centralized, multi-user functionality. However, each client computer 102, 104, 106, 108 and 120 can perform functions for other computers, including the clients and servers, thus acting as a "server" for that other computer system. Similarly, each of the servers 110, 112, 114 and 116 can perform functions and relay information to the other servers, such that each server may actually be a "client" requesting information or services from another computer in particular circumstances. Therefore, the term "client," as used hereinafter refers to any computer system making a call or request of another computer system and the term "server" is the computer system that services the request.

On the other hand "client processes," which refer to operations that request information or services from "server processes" may actually be communicating on the same machine. Therefore, the term "caller" is used hereinafter to indicate a client-type process that requests information or services from another operation or process.

As part of the sophisticated network administration, each computer must be able to access applications and resources available on the other computers in the network 100 and therefore must be able to access configuration data related to the applications and resources available on the other computers. The configuration data is located within memory on each computer system, i.e., in a datastore. Additionally, each computer system typically has more than one datastore of configuration information that needs to be accessed by the other computer systems. Moreover, the different datastores may each have different data types or formats. In order to access configuration information from these many and various computer datastores, a client or caller, i.e., the system or process making the request for information, communicates with a "catalog" interface on the server computer system.

Figure 2:
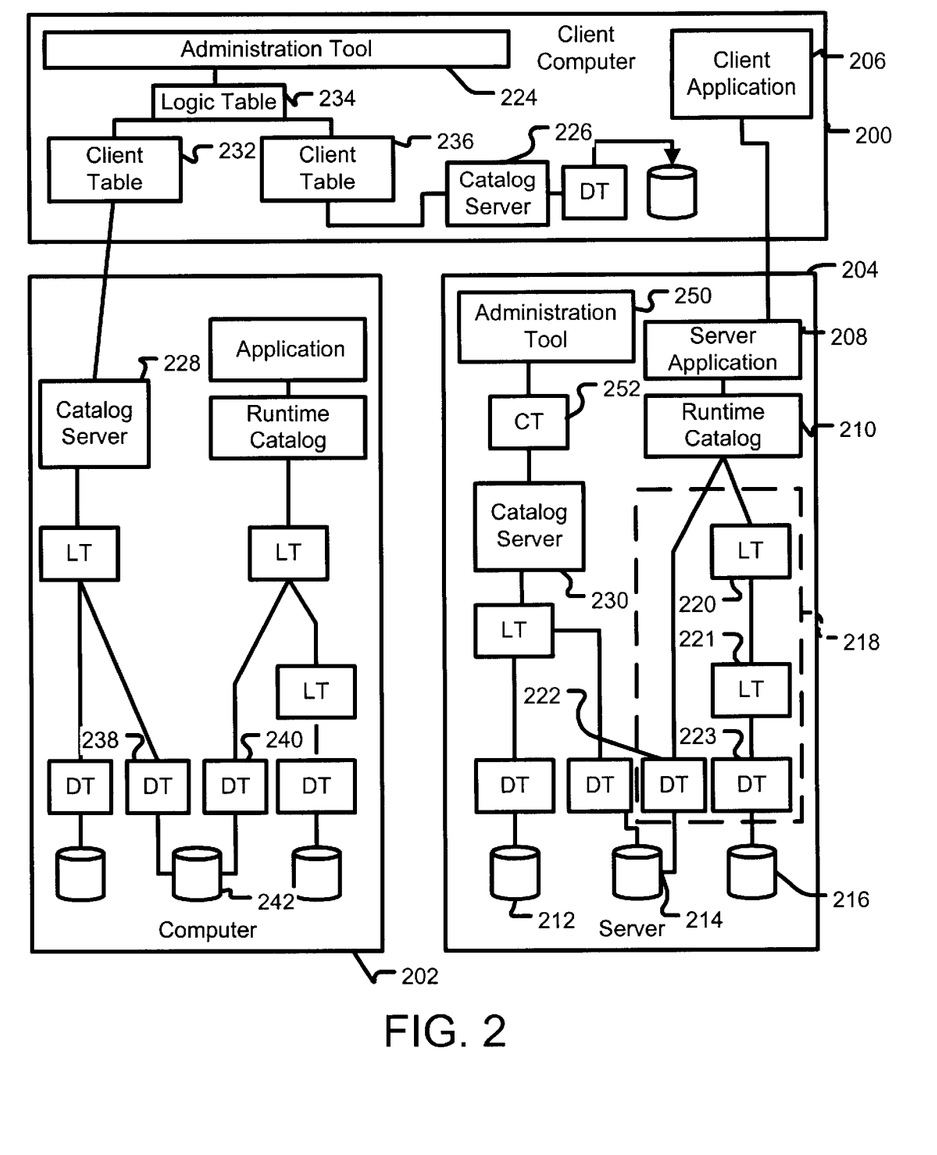
FIG. 2 illustrates the interaction related to various requests for configuration information by one of the clients shown in FIG. 1 to two different servers shown in FIG. 1.

FIG. 2 depicts an exemplary client/server architecture employing COM+ catalogs (Component Object Model) in accordance with the present invention. A COM+ Catalog is a virtualized database of COM+ applications and their services, with runtime and configuration-time abstraction layers for using and manipulating configuration information. An embodiment of the present invention, for example, may be employed in a component-based programming model of a transaction processing runtime environment for developing, deploying, and managing high-performance, scaleable, and robust enterprise Internet and intranet server applications.

A "component" is software containing classes that may be created and exposed as "objects" (i.e., self-contained programmed entities that consist of both data and functions to manipulate the data) for use by another application. A component can also use objects exposed by another application. For example, a developer can create an application using ActiveX components that can be updated and managed easily as in-process DLLs (Dynamic Link Libraries). The DLLs are then installed into the COM environment for execution within the application. Components can be developed specifically for a developer's single application, developed for use with multiple applications, or purchased from a third party.

COM technology allows a piece of software to offer services to another piece of software by making those services available as "COM objects." COM is a foundation for an object-based system that focuses on reuse of interfaces. It is also an interface specification from which any number of interfaces can be built. Each COM object is an instance of a particular class and supports a number of interfaces, generally two or more. Each interface includes one or more methods, which are functions that can be called by the objects' clients.

COM+ technology is an extension of COM technology that includes a new runtime library that provides a wide range of new services, such as dynamic load balancing, queued components, an in-memory database, and events. COM+ technology maintains the basics of COM technology, and existing COM-based application can continue to work unchanged in a COM+ environment.

An object implemented to comply with COM+ is referred to as a COM+ object. A component that includes one or more classes that may be instantiated as a COM+ object is referred to as a "COM+ component". Each COM+ component has attributes, which can be set in a component (or type) library. Attributes are a form of configuration data required by many software components to execute correctly and completely. An application that includes COM+ components is referred to as a "COM+ application". When a component is made part of a COM+ application, its component (or type) library is written into a COM+ catalog. When an object is instantiated from that component, the attributes in the COM+ catalog are examined to determine the object context that contains properties for the object. Based on the object context, other services required by the object are provided. In this manner, a developer can merely identify in the attributes the additional functionality required by the object, and based on the object's attributes, the appropriate other services that are available within the system, or the accessible network, are executed to provide that functionality.

In FIG. 2, a client computer 200 is coupled via a network to one or more remote computers (e.g., a computer 202 and a server 204). Although the embodiments of the present invention are illustrated and described herein relative to multiple computer systems coupled by a computer network or other communications connection, it is to be understood that an embodiment of the present invention may be employed in a stand-alone computer system to provide access to configuration information in the system.

A client application 206 executes on the client computer 200 to access a server application 208 executing on the server 204. For example, the server application 208 may include a database application that receives a query from the client application 206 and accesses a customer database (not shown) for all customer data satisfying the query. During operation, the server application 208 may require configuration data recorded in a datastore (such as datastores 214 or 216). For example, a transaction server application can determine the security level of a user according to a "role" assigned to the user by an administrator or other means. Accordingly, the transaction server application might query a role definitions database to validate the user's access to a transaction database (not shown). In another example, the server application 208 accesses configuration information to verify that required services are available for its execution.

To obtain configuration information in the illustrated embodiment, the server application 208 accesses a runtime catalog 210 running on the server 204. The runtime catalog 210 causes one or more table object dispensers to create catalog table objects (shown generally at 218) to provide the required configuration data in a table to the server application 208. A "table object" includes an object that provides a caller with access to underlying data, presenting that data in virtual "table" format through a defined table interface. A table object may also provide its own functionality, read and write caching and the triggering of external events, in addition to other features. The table data is accessed by a caller (e.g., a catalog server, a runtime catalog, or an overlaying logic table object) by way of a table-oriented interface, preferably including table cursor methods. In the exemplary embodiment, the runtime catalog 210 accesses configuration data in the datastores 214 and 216 through layers of abstraction provided by the table system 218 (i.e., logic table objects ("LT"), such as logic table object 220, and data table objects ("DT"), such as data table object 222).

A globally unique database ID (identifier) called a "DID" identifies each catalog database. A given DID guarantees a minimum well-defined set of catalog tables, each table being identified by and complying to the rules of a table ID (TID). A DID is a datastore-independent identity, meaning that the tables of that database can be distributed among multiple datastores. Examples of datastores include the registry, type libraries, SQL (structured query language) Servers, and the NT Directory Service (NT DS), whereas examples of databases include: server group databases, download databases, and deployment databases.

A data table object, such as data table object 222, is a datastore-dependent table object that exposes a table cursor into a particular datastore. The table cursor provides a well-defined table-oriented interface into the datastore while hiding the location and format of the underlying datastore itself. For example, a caller can use a table cursor to navigate through the rows of a column in a table presented to the caller by a table object.

Each data table object is bound to a particular datastore accessible within the computer. For example, a data table object may be bound to the registry to provide the registry data in table form to a higher level (e.g., an overlaid logic table object, catalog server object, or runtime catalog). Another data table object may be bound to the NT Directory Services to provide directory configuration data to a higher level. As shown by data table objects 238 and 240, multiple data table objects may be created for a single datastore (e.g., data table objects 238 and 240 are created by different logic tables objects to provide access to the same datastore 242).

The data table object 222 populates one or more internal caches with read or write data associated with the datastore 214. Queries to the datastore 214 are serviced by the cache or caches through the data table object's table interface. Using at least one "update" method, data in the read cache of data table object 222 may be refreshed from the datastore 214 and data in a write cache may be flushed to the datastore 214.

A logic table object, such as logic table object 220, presents domain-specific table data by logically merging or consolidating table data from multiple data table and/or logic table objects, supplementing table functionality, and/or synthesizing data into the table, in accordance with a given type of configuration information requested (e.g., configuration information for Components, Applications, etc.). The domain-specific nature of the table data is preferably defined by at least one table dispenser input parameter, including without limitation a database ID, a table ID, a query parameter, or a level of service parameter). Logic table objects in a COM+ Catalog environment are type-independent abstraction layers between a caller (such as the runtime catalog 210) and one or more datastores (such as datastores 214 and 216) containing configuration information. A logic table object typically sits atop one or more data table objects and introduces domain-specific rules and processes to the underlying data table objects, although other configuration of table systems are possible.

More specifically, a logic table object can logically consolidate configuration data from multiple data table and/or logic table objects into a single table based on predetermined logic (e.g., according to type). Furthermore, a logic table object can supplement data table object functionality by intercepting interface calls from a client and adding to or overriding the underlying table object functionality (e.g., adding validation or security). Additionally, a logic table object can synthesize data that is not available from the underlying datastores or tables and present the synthesized data as part of the table. Logic table objects are described in more detail in U.S. patent application Ser. No. 09/360,440, entitled "A LOGIC TABLE ABSTRACTION LAYER FOR ACCESSING CONFIGURATION INFORMATION," assigned to the assignee of the present application, filed concurrently herewith and incorporated herein by reference for all that it discloses and teaches.

The foregoing discussion has described the COM+ Catalog environment as used at runtime by an application. An alternate use of a COM+ Catalog occurs at configuration-time and may employ one or more catalog server ("CS") and one or more client table objects. During configuration, an administration tool, such as Microsoft's Component Services administration tool or COMAdmin Library, is used to create and configure COM+ applications, install and export existing COM+ applications, manage installed COM+ applications, and manage and configure services locally or remotely. Accordingly, in addition to the illustrated embodiments, an embodiment of the present invention may be employed by a local administration tool managing an application running on a remote computer system.

The exemplary administration tool 224 executes on the client computer 200 in FIG. 2. An alternative administration tool (such as administration tool 250) can execute on another computer (such as server 204) to configure applications and services executing in the computer. A catalog server object, such as catalog server objects 226, 228, and 230, manages configuration information on its computer. All administration requests to a computer, whether local or from another computer, go to a catalog server object on that computer, preferably through one or more abstraction layers, including client table objects and logic table objects.

A client table object ("CT") is analogous to a data table object that binds to a particular local or remote catalog server object instead of a datastore, presenting the configuration information marshaled by a catalog server object in table form to the caller, such as the administration tool 224. The local catalog server object 226 manages configuration data locally on the client computer 200, while the remote catalog server object 228 service catalog requests from the client table object 232 for configuration information on its remote computer. "Remote" does not necessarily imply that a remote computer geographically distant from a local computer. Instead, remote merely indicates a cross-computer boundary, which may be bridged by a data bus, a network connection, or other connection means.

To access available catalog data in the illustrated exemplary embodiment, the administration tool 224 optionally causes a logic table object 234 to be created, which in turn causes client table objects 232 and 236 to be created for accessing available catalog server objects 226, and 228. The local catalog server object 226 and the remote catalog server object 228 marshal the configuration information stored within their corresponding computers by causing creation of underlying table systems and transferring the data back to the client table objects 232 and 236 for presentation as table data to the logic table object 234, which logically merges the configuration information and presents the configuration information to the administration tool 224 in table format. In the illustrated embodiment, multiple domain-specific logic table objects (such as logic table object 234) can reside between the client table objects 232 and 236, and the administration tool 224. Alternatively, the administration tool 224 may cause only a single client table object (with or without overlaying logic table objects) to be created to access a single catalog server object on a local or remote computer.

Figure 3:
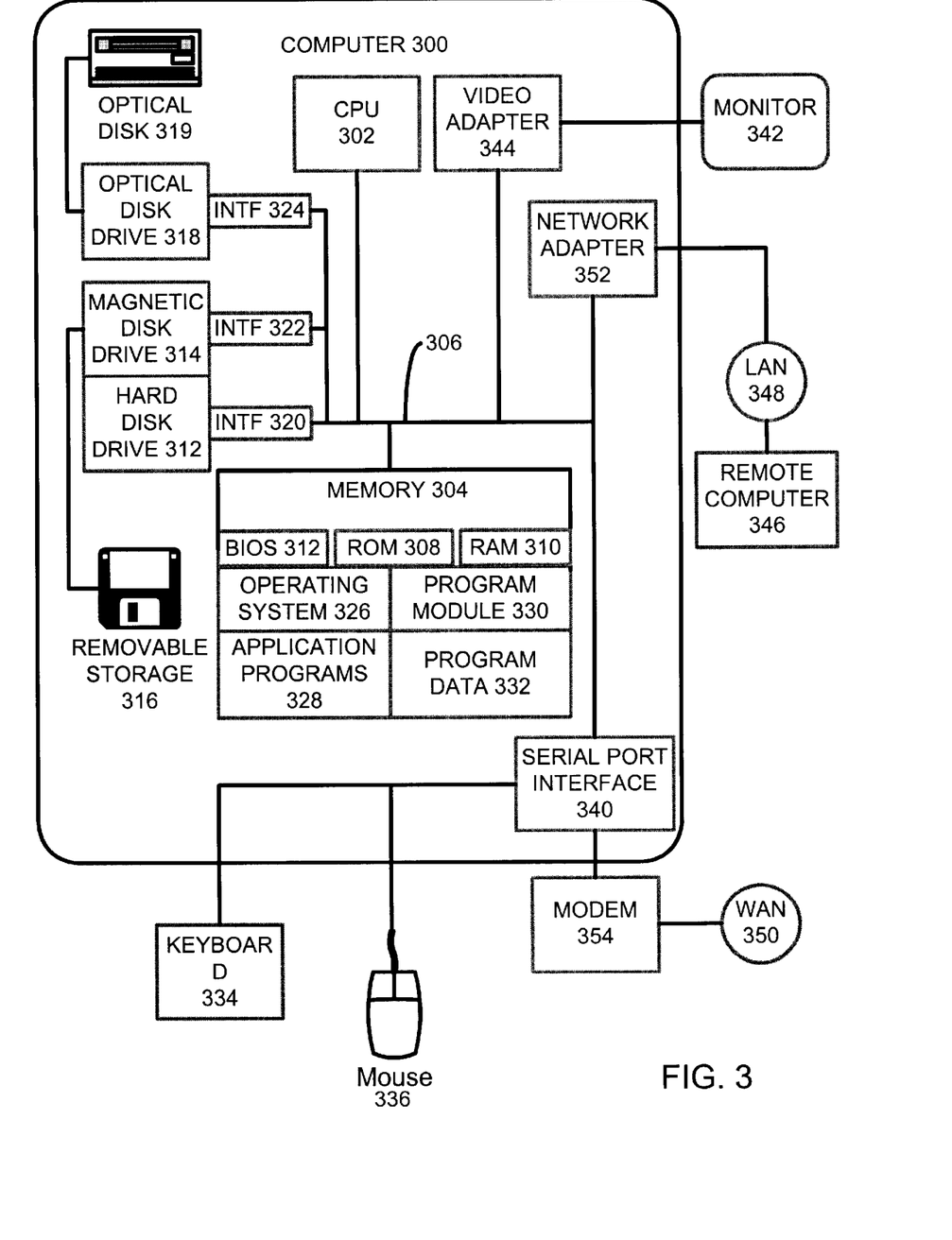
FIG. 3 shows an exemplary computer system representing one of the clients or servers shown in FIG. 1.

With reference to FIG. 3, an exemplary computing system for embodiments of the invention includes a general purpose computing device in the form of a conventional computer system 300, including a processor unit 302, a system memory 304, and a system bus 306 that couples various system components including the system memory 304 to the processor unit 300. The system bus 306 may be any of several types of bus structures including a memory bus or memory controller, a peripheral bus and a local bus using any of a variety of bus architectures. The system memory includes read only memory (ROM) 308 and random access memory (RAM) 310. A basic input/output system 312 (BIOS), which contains basic routines that help transfer information between elements within the computer system 300, is stored in ROM 308.

The computer system 300 further includes a hard disk drive 312 for reading from and writing to a hard disk, a magnetic disk drive 314 for reading from or writing to a removable magnetic disk 316, and an optical disk drive 318 for reading from or writing to a removable optical disk 319 such as a CD ROM, DVD, or other optical media. The hard disk drive 312, magnetic disk drive 314, and optical disk drive 318 are connected to the system bus 306 by a hard disk drive interface 320, a magnetic disk drive interface 322, and an optical drive interface 324, respectively. The drives and their associated computer-readable media provide nonvolatile storage of computer readable instructions, data structures, programs, and other data for the computer system 300.

Although the exemplary environment described herein employs a hard disk, a removable magnetic disk 316, and a removable optical disk 319, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 316, optical disk 319, ROM 308 or RAM 310, including an operating system 326, one or more application programs 328, other program modules 330, and program data 332. A user may enter commands and information into the computer system 300 through input devices such as a keyboard 334 and mouse 336 or other pointing device. Examples of other input devices may include a microphone, joystick, game pad, satellite dish, and scanner. These and other input devices are often connected to the processing unit 302 through a serial port interface 340 that is coupled to the system bus 306. Nevertheless, these input devices also may be connected by other interfaces, such as a parallel port, game port, or a universal serial bus (USB). A monitor 342 or other type of display device is also connected to the system bus 306 via an interface, such as a video adapter 344. In addition to the monitor 342, computer systems typically include other peripheral output devices (not shown), such as speakers and printers.

The computer system 300 may operate in a networked environment using logical connections to one or more remote computers, such as a remote computer 346. The remote computer 346 may be a computer system, a server, a router, a network PC, a peer device or other common network node, and typically includes many or all of the elements described above relative to the computer system 300. The network connections include a local area network (LAN) 348 and a wide area network (WAN) 350. Such networking environments are commonplace in offices, enterprise-wide computer networks, intranets, and the Internet.

When used in a LAN networking environment, the computer system 300 is connected to the local network 348 through a network interface or adapter 352. When used in a WAN networking environment, the computer system 300 typically includes a modem 354 or other means for establishing communications over the wide area network 350, such as the Internet. The modem 354, which may be internal or external, is connected to the system bus 306 via the serial port interface 340. In a networked environment, program modules depicted relative to the computer system 300, or portions thereof, may be stored in the remote memory storage device. It will be appreciated that the network connections shown are exemplary, and other means of establishing a communications link between the computers may be used.

In an embodiment of the present invention, the computer system 300 stores the configuration data and implementation code providing the catalog infrastructure and disclosed and claimed herein in accordance with the present invention. The catalog infrastructure has without limitation one or more datastores, catalog servers, runtime catalogs, server applications, administration tools, dispensers, and wiring databases. Specifically, one or more dispensers, preferably including a table dispenser and an table object dispenser, provide a table object to a caller providing location and type independent access to configuration information stored in one or more datastores.

The embodiments of the invention described herein are implemented as logical steps in one or more computer systems. The logical steps of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, or modules.

Figure 4:
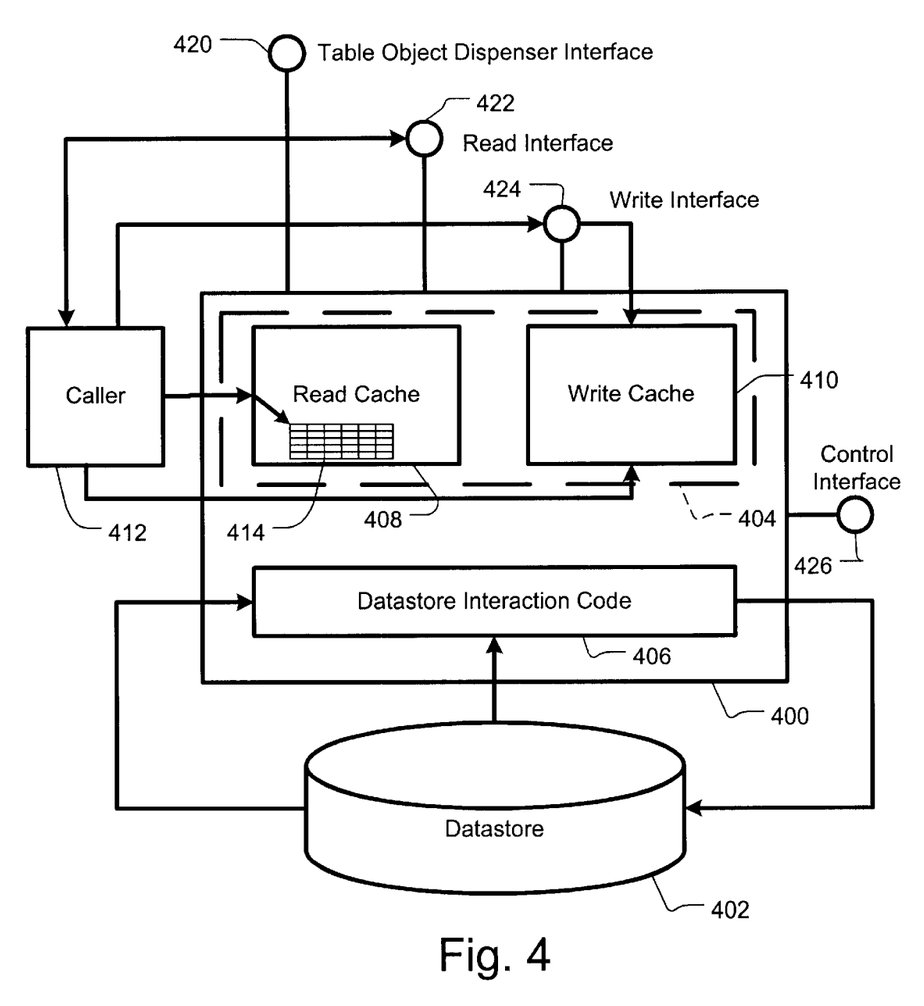
FIG. 4 illustrates more details of the data table object shown in FIG. 2.

In order to access configuration data from any of the datastores shown in FIG. 2, a data table object, such as data table object 400 shown in FIG. 4, is created and used as an interface to the configuration information in the datastore. The data table object 400 interacts with datastore 402, both reading information out of the datastore 402 and writing information to the datastore 402. The data table object 400 may have a memory cache 404 and datastore interaction code 406 that performs the interaction between the datastore 402 and the cache 404. Preferably, the data table object 400 is the only interface mechanism used by the COM+ catalog (FIG. 2) to access the configuration information in the datastore 402 such that the data table object 400 prevents caller applications from directly accessing the information in the datastore 402, i.e., encapsulates the information from the caller. Instead, the caller operates on the cached information copied into cache 404 from the datastore 402.

The information is copied into the cache 404 creating a data level table 414, i.e., a table of configuration information accessible by the caller and presented by the data table object 400 wherein the data level table 414 preferably has a general row and column table format. The information may be stored in a marshaled format or may be stored in an unmarshaled format.

The datastore interaction module or code 406 receives commands from the caller and executes the commands on the datastore 402. The commands are preferably generic stemming from a predetermined set of recognized commands, i.e., a "standardized interface," and the commands do not depend on the type of datastore 402 or the type of actual commands used to access information in the datastore. Instead, the datastore interaction code 406 translates the particular commands into proper format to access information in the particular datastore 402. For example, the datastore may be the registry and the datastore interaction code 406 for accessing information in the registry may be different from the datastore interaction code (not shown) for a different data table object that accesses an SQL database. However, the commands sent by the caller are standardized such that the caller merely makes a type-independent request and the datastore interaction code 406 handles the translation. The standardized command set enables the creation of new and different datastores by merely implementing the datastore interaction code related to the datastore format.

The datastore interaction code 406 interacts with the datastore 402 to populate the cache and update the datastore. That is, the code 406 receives commands from the caller requesting that the cache be populated with a specific portion of data from the datastore 402 based on a supplied query. Code 406 generates and conducts an interaction command to the datastore implementing the populate request to populate the cache with the requested information. That is, the data table code 406 translates the query into the proper format and requests the information based on the query. The query is related to the type of information, as opposed to requests that simply identify specific data.

Similarly, an "update" datastore commands received by the data table object 400 are translated by the code 406 into the specific format required to update or modify the datastore 402. Preferably, the code 406 is the only executable code of the catalog schema shown in FIG. 2 that is designed to modify the configuration information contents of the datastore 402. Such encapsulation decreases the probability that others can modify or tweak the operational parameters of the system and thereby jeopardize the integrity of the system.

Additionally, the code 406 may interact with the datastore based on control-type commands from the caller. Such control-type commands may include initialization of the datastore 402 or merely the transfer of data to the datastore unrelated to the requested configuration information.

Allocation of the cache 404 occurs during the creation of the data table object 400. The cache 404 has a read cache 408 and a write cache 410. The read cache 408 is generally not modifiable and is populated with a specific configuration information table as a result of a query by a caller 412. Code 406 executes the query request and stores the returned information in tabular form in the read cache 408. The data table object 400 uses the write cache 410 to store proposed modifications or additions to the datastore configuration information. Such information is stored until the caller requests that the code 406 update the datastore. At that time the code 406 uses the information in the write cache to perform an update datastore command.

In alternative embodiments, the cache 404 comprises only a read cache or a write cache. Such other embodiments are typically beneficial in particular circumstances when only reading or writing is desired since those embodiments provide better performance for quick reads or writes by providing a smaller working set for the caller. Preferably, the caller can choose a level of service that provides either the combined read and write cache 404 as shown in FIG. 4 or just a read cache 408 or just a write cache 410. Therefore, as little cache as necessary is allotted the data table object 400 during creation which frees additional memory in the computer system to be used by other processes.

In yet another embodiment, the cache module is part of another object, and the data table object 400 primarily provides access to the datastore, transferring information to and from the other object having the memory module or buffer. Hence, although the cache 404 and the code 406 are shown as elements of the data table object 400, the cache and code are relatively distinct from each other. The code 406 simply performs operations using the cache 404.

The data table object 400 is preferably an instantiated object in the object-oriented catalog management system shown in FIG. 2. As an object, the data table object 400 exposes interfaces that enable the caller to interact with the data table object 400 by supplying the caller with pointers to the interfaces. It is through these interfaces that the standardized methods are implemented for each data table object. The table 414 is accessed through these methods enabling the user to read and write rows and columns of table 414.

The caller that interacts with the data table object 400 is either the catalog server, the runtime catalog or another logic table, as shown in FIG. 2. Each of these potential callers is preferably an instantiated object as part of the catalog management system and therefore, the caller 412 is a "trusted caller." Since the caller is trusted, it gets a pointer directly into the read cache 408. If the caller were not trusted, the caller copies the information to another portion of memory in order to maintain the integrity of the cache memory.

Figure 5:
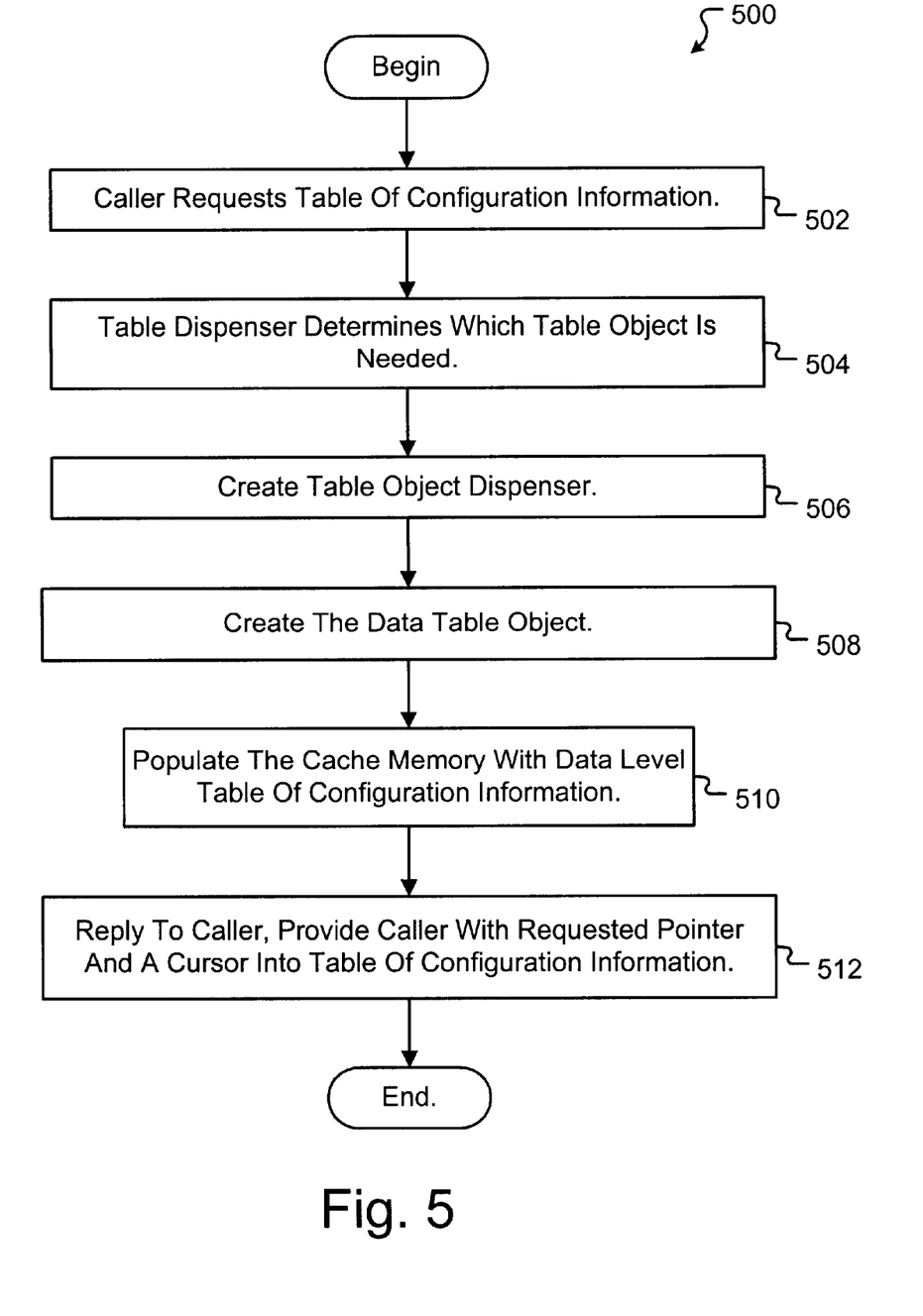
FIG. 5 is a flow chart illustrating the operations involved in creating a data table, such as the data table shown in FIG. 4.

The operations of a preferred embodiment for creating data table object 400 are shown in FIG. 5. Initially, request operation 502 requests or calls for a configuration information table. A caller initiates operation 502 and the request includes identifying information related to the configuration information requested. The identifying information does not request information by datastore, instead the information is requested via type of information and includes query information. The request is received by a "table dispenser" (not shown) which executes specific program analysis and code to create the data table object instance 400 shown in FIG. 4. The use of the table dispenser in combination with a "wiring database" and an "implementation dispenser" to create the data table object 400 is described in more detail in U.S. patent application Ser. No. 09/360,445, entitled "OBTAINING TABLE OBJECTS USING TABLE DISPENSERS," assigned to the assignee of the present application, filed concurrently herewith and incorporated herein by reference for all that it discloses and teaches.

In general, the table dispenser conducts determination operation 504 to determine which datastore contains the requested configuration table. The table dispenser queries a wiring database (not shown) that may or may not be part of the table dispenser and the wiring database indicates the class identifier ("clsid") of the particular a data table object component needed to access the particular configuration information.

Once the clsid is determined, create operation 506 creates an implementation dispenser (not shown). The table dispenser creates the implementation dispenser. Following creation of the implementation dispenser, create operation 508 creates the data table object 400. Preferably the data table object 400 shown in FIG. 4 is a COM object (which can be implemented in many different programming languages) and therefore the implementation dispenser creates the data table object 400 using the known COM-command "CoCreateInstance." The clsid is a parameter used in the CoCreateInstance request that is related to data table object for a specific datastore and the type of interface requested. Preferably, the clsid is a universally unique identifier and therefore, no conflicting identifier exists in the system. CoCreateInstance is called or executed by the implementation dispenser.

Creating the data table object 400 establishes the connection to an allocated portion of cache memory in the computer system and begins execution of the code 406. The code 406 establishes a connection to datastore 402 (or contains a pointer to the datastore for later use.) Additionally, the creation typically performs any necessary initialization procedures required to allow further function requests. Once the data table object 400 is created, a pointer is returned to the caller, which points to the requested interface of the data table object 400, assuming no errors occurred during creation. CoCreateInstance knows how to create an instance of the object.

Preferably the read cache 408 is populated by operation 510 immediately following the creation of the data table object 400. The populate command is essentially part of the initialization routine since it is typically the first function call by the caller, it is preferable to have the data table object populated prior to returning to interface pointer to the caller. This operation can be left to the caller in other embodiments of the present invention.

Once created and populated, reply operation 512 passes the requested interface pointer, which was part of the original request, related to a particular interface. The caller is also provided with a pointer, i.e., a cursor into the read cache 408 which enables the caller 412 to begin accessing information from the data level table 414.

As a COM object, the data table object 400 shown in FIG. 4 has interfaces that are exposed wherein each interface provides various methods. The exposed set of interfaces are used by either the caller to read or write the table of configuration information presented to the caller in the cache 404 or by other processes to control the data table object 400. Interface 420, for example is not exposed to the caller but is used by the table object dispenser to create the data table object 400. The table object interface 420 can be implemented either on the table object 400 or on a separate dispenser object (as expressed in FIG. 5). Either way, the difference is encapsulated from the caller. Interface 422 exposes read methods and allows the caller to access and manipulate the cursor within the read cache 408. Interface 424 exposes the write methods. Additionally, the interface 424 inherits from the read interface 422 so that the caller can perform read and write methods using interface 424. Additionally, the data table object 400 comprises control interface 426 which exposes control-type methods not necessarily required to implement the data table object 400 but provide added functionality to the data table object 400.

The primary methods exposed by the data table object 400 generally include at least one populate method, at least one update method, and read/write/navigate methods. Additional methods are also preferably exposed to enhance the functionality of the data table object 400. The populate method relates to populating the read cache with data from the datastore 402 based on a supplied query. The update method updates the datastore using information stored in the write cache 410. The read/navigate methods allow for row navigation and enable the caller to view different rows in the configuration table or to view columns of information. Additionally, the data table object 400 provides write methods to place data in the write cache and control-type methods that are exploitable by the caller.

Figure 6:
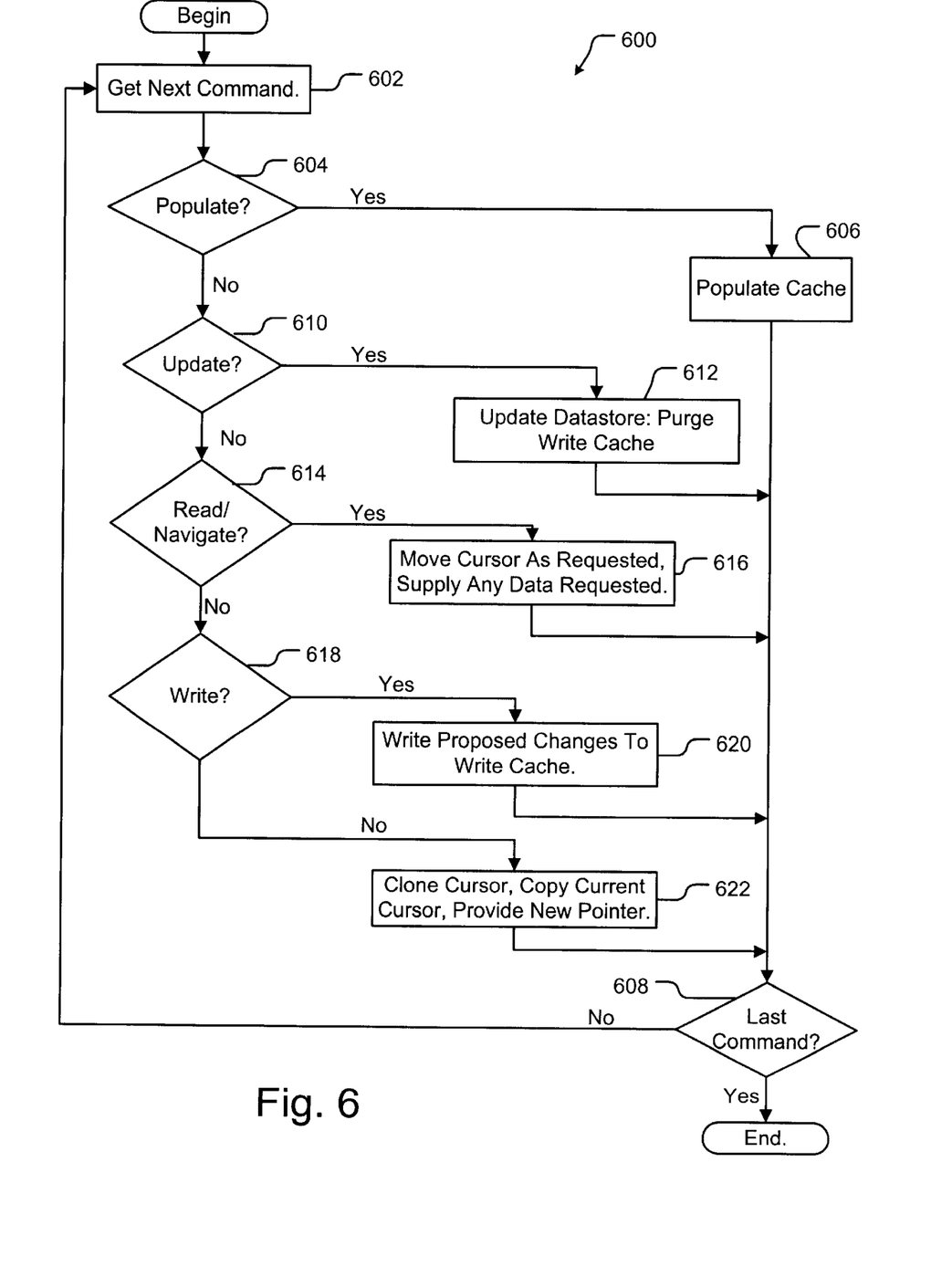
FIG. 6 is a flow chart illustrating the operations involved in accessing configuration data using a data table, such as the data table shown in FIG. 4.

FIG. 6 illustrates an exemplary process 600 of method steps involved during the use of the data table object 400. The process 600 following a caller's receipt of an interface pointer, such as pointers to interfaces 422, 424 and 426 shown in FIG. 4. The caller begins by supplying a command or method request to be carried out by the data table object 400 as represented by get next command operation 602 shown in FIG. 4. That is, get next command operation 602 gets or receives the next command from the caller to be executed.

Following the receipt of the command at 602, the determination step 604 determines whether the command is a populate command or method. Populate methods, as described above, are interpreted by the data table object 400 as a command to interact with the datastore 402 and copy information from the datastore 402 into cache 404. The populate command typically provides query information or some other information enabling the datastore interaction code 406 to retrieve the requested configuration information.

If determination operation 604 determines that the method is a populate command, then flow branches YES and operation 606 populates the cache 404 with the requested information. Preferably, populate operation 606 overwrites the information existing in the cache 404. However, the data table object 400 may enter a special internal population state using a "PrePopulateCache" method which has the option of retaining and appending to the existing contents of the read cache which enable the data table object 400 to accumulate data in multiple stages. Additionally, operation 606 preferably provides the caller with a pointer to the first row and first column of the populated cache.

Following population operation 606, last command determination 608 determines whether another command must be executed. If not, then flow branches YES and process 600 is complete. Otherwise, flow branches NO and operation 602 gets the next command and process 600 is executed again.

If determination operation 604 determines that the command is not a populate command, then flow branches NO and determination operation 610 determines whether the command is an update command.

If the command is an update command then flow branches YES of update operation 612 update the datastore 402. Preferably, this operation uses the information in the write cache 410 to modify the existing data in the datastore 402. The process involves binding to and communicating with the datastore 402 using datastore interaction code 406. Additionally, this operation also purges the write cache 410 as the information in this cache following the update may not be relevant. However, if predetermined errors occur during the update operation, the data table object 400 actually retains the write cache contents. The caller, using an error method, e.g., "GetDetailedError," can determine the cause of the error. Since each detailed error contains the row on which the problem occurred (or a special indicator indicating all rows), the column on which the error occurred (or a special indicator indicating all columns in the row), and an error code used to identify the problem. The caller can inspect each detailed error and then inspect the data in the write cache. The caller can clear the write cache without updating the datastore with DiscardPendingWrites method or edit the write cache contents to correct the cause of the error and attempt to update the datastore again.

The update datastore operation 612 preferably does not purge the read cache. The data table object 400 incorporates separate read and write caches since the caller receives column values by direct pointer into the read cache. Making a set of pending changes might require re-allocating the write cache as needed for growth. Since this is a separate cache, the caller is guaranteed that the pointers they hold into the read cache remain valid as pending changes are accumulated, and then even when they are pushed to storage in the datastore using the update datastore operation 612. The only time the caller's pointers into the read cache become invalid is either re-executing the query via PopulateCache or releasing the table object.

Following the update command, last command decision operation 608 determines whether there are more commands to process as described above.

If decision operation determines that the requested command is not an update command then decision operation 614 determines whether the command is a read or navigate command. If the command is a read or navigate command then flow branches YES as shown in FIG. 6 and operation 616 performs the requested read or navigate function. Typically a navigate command also presents data to the caller from the current cell within the table of configuration information. Preferably, no changes are made to the cache 404 during read and navigate command execution. Following the read/navigate operation 616, last command decision operation 608 determines whether more commands are to be executed, as described above.

If the command is not a read or navigate command as determined by decision operation 614, flow branches NO and decision operation 618 determines whether the command is a write command. If the command is a write command then flow branches YES and write operation 620 performs the function of storing the requested write operation to the write cache 410. Following storing of this information to the write cache 410, decision operation 608 determines whether more commands are to be executed, as described above.

If the command is not a write command as determined by decision operation 618, then flow branches NO and control operation 622 performs the control function. Typical control type functions include cloning the cursor or providing a new pointer. Following the completion of the control command at operation 622, decision 608 determines whether more commands are to be executed, as described above.

The preferred commands or interface methods available to caller 412 in a preferred embodiment are "Initialize," "PopulateCache," "UpdateStore," "UpdateReadCache," "RestartRow," "GetNextRow," "MoveToRowByIdentity," "MoveToRowByIndex," "MoveToNewRow," "SetRow," "DeleteRow," "SetColumn," "GetColumn" and "CloneCursor." These methods relate to commands that the caller can execute on the data table object 400 in order to effectively access the configuration information in the datastore 402 and each falls into one of the categories of populate, update, read/navigate, write, or control as described above with respect to FIG. 6.

The "Initialize" method allows the passing of information delivered from the table dispenser related to table identity, query, level of service, etc. to the datastore 402. This method allows the datastore to perform various functions, if desired. However, most often no tangible result occurs due to the initialize operation.

As described above, "PopulateCache" reads information from the datastore and stores the information in the read cache 408. The PopulateCache method uses the database, table, and query specified by the caller to determine which configuration information table or tables to store in the read cache 408. Additionally, the populate operation reads the information in the datastore, which may not be in table format with rows and columns, and produces a table which is then stored in the cache.

Method "UpdateStore" writes all pending changes to the datastore and forgets those changes, i.e., clears the write cache. This is the only method that which writes to the datastore.

Method "UpdateReadCache" allows the caller to update the read cache with pending changes stored in the write cache. This method does not change either the write cache or the datastore.

Methods "RestartRow," "GetNextRow," "MoveToRowByIdentity," "MoveToRowByIndex" and "MoveToNewRow" are all methods to move the cursor within the read cache. Such methods provide the caller the ability to navigate a table to selectively read or modify any portions of an entire table. Also, such navigation is beneficial in parsing a table as needed to move or copy the table. With the exception of "MoveToNewRow," each method does not modify the read or the write cache.

Method "MoveToNewRow" does not modify the write cache per se, but this method causes the cursor to move to a new row held by the cursor and method "SetRow" inserts the row into the write cache. Additionally, the cursor does not move until "SetRow" has been called. Preferably, all non-default columns are set prior to setting a new row with "SetRow." Method "SetRow" is also used to modify an existing row. Indeed, this method updates the write cache (not the datastore) with changes made to the current row, i.e., the row containing the cursor at the time of the set row call.

Method "DeleteRow" marks the current row for deletion in the write cache.

Method "SetColumn" prepares to set a predetermined column of the current row using data supplied by the caller. The change is held by the cursor until "SetRow" is called.

Method "GetColumn" gets the data for a predetermined column of the current row.

Method "CloneCursor" provides another cursor to the read cache, preferably in the same location as the current cursor.

In a preferred embodiment the read cache is populated upon creation. Therefore, populate method is only used via an advanced interface which clears the read cache and re-executed the previous query on the datastore to populate the cache. Another operation that effects the cache 404 is UpdateStore which clears both the read cache and the write cache. That is, following an update, any information remaining in the read cache is now stale and therefore is cleared. Additionally, once the update is complete, the write cache comprises stale, useless information and therefore cleared.

Since most of the operations are performed on the information that is in cache the data in the datastore is generally encapsulated and protected from these operations. Indeed there are only three methods exposed that cause the code 406 of the data table object 400 to actually interact with the datastore 402. The methods include the read-only activity of populating the cache, the initialization method and the update store method.

Data table 400 presents configuration information table 414 to the caller through these methods. In the case where the caller is a logic table, such as logic table 221 in FIG. 2, the caller uses the table 414 to either create a new table for presentation to its caller or uses the information to activate other services or events. In the case where the caller is a catalog server, such as catalog server 226, then the table 414 may be marshaled to a client table, such as client table 232 or 236 shown in FIG. 2, located on the same computer. Or, in the case where the caller is a catalog server, such as catalog server 230, then the table 414 may be marshaled to a client table, such as client tables 236, located on a remote client computer.

Implementing the data table object 400 to provide the functionality as described above enables the upper levels of abstraction and program code, including the catalog server, logic tables, runtime catalog, etc. to separate themselves from the primary aspects related to actually storing and retrieving data. The data table object provides an interface that is relatively independent of the type or format related to the particular datastore. Additionally, this particular method of interfacing with datastores makes it fairly simple to implement a new and different datastore. If the cache allocation is acceptable, a new datastore only needs to implement the three methods of being able to initialize the datastore, populate the cache using information in the datastore and update the datastore using information in the write cache. The datastore interaction code communicates with the cache using relatively standardized functions and therefore the only implementation details relate to retrieving and storing data to and from the specific datastore. The interface also separates the need for an upper level caller to know the actual location of the datastore. Additionally, implementing the datastore encapsulates datastore information from the caller and thus protects the integrity of the system.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of presenting configuration information stored in a datastore to a computer process caller within a computer system, said method comprising:
    generating a data table object that is bound to the datastore wherein the data table object is associated with a cache memory;
    populating the associated cache memory with configuration information from the datastore in response to a request from the caller;
    providing the caller with a cursor to the configuration information in the cache memory; and
    allowing the caller access to the configuration information in the memory via a standardized command set.

2. A method of presenting configuration information stored in a datastore to a computer process caller within a computer system having memory, said method comprising:
    receiving a request from the caller relating to the requested configuration information;
    analyzing the request to determine which datastore holds the requested information;
    generating a data table object that is bound to the determined datastore wherein the data table object comprises datastore interaction code;

populating the memory with configuration information in response to a request from the caller using the datastore interaction code;

providing the caller with a cursor to the configuration information in the memory; and allowing the caller access to the configuration information in the memory via a standardized command set.

3. A method of presenting configuration information stored in a datastore to a computer process caller within a computer system having memory, said method comprising:

populating the memory with configuration information in response to a request from the caller;

providing the caller with a cursor to the configuration information in the memory;

allowing the caller access to the configuration information in the memory via a standardized command set; and wherein the configuration information is presented to the caller in tabular form creating a table of configuration information and wherein the cursor provides the caller with access to a predetermined location within the tabular form of data to read and write portions of the table of configuration information.

4. A method of presenting configuration information as defined in claim 3 wherein the caller is a computer process operating in a remote computer system.

5. A method of presenting configuration information as defined in claim 3 wherein the method further comprises the following steps:

accessing the information in the datastore in response to a query of information from the caller; and converting the information into tabular form prior to populating the memory.

6. A method of presenting configuration information as defined in claim 5 wherein the method further comprises the steps of:

responding to read commands from the caller to iterate over the table of configuration information in a read cache portion of memory to provide the configuration information values to the caller;

responding to write commands from the caller to write information to a write cache portion of memory.

7. A method of presenting configuration information as defined in claim 5 wherein the caller is encapsulated from the configuration information in the datastore.

8. A method of presenting configuration information as defined in claim 1 wherein the caller requests the configuration information using a type-independent request.

9. A method of presenting configuration information as defined in claim 8 further comprising the step of converting the format of the information into a recognizable type for the caller.

10. A data table object interface module for accessing system configuration information for a computer process caller within a computer system, the configuration information stored in a datastore, said data table object module comprising:

a cache memory module accessible by the caller and adapted to store information to be presented to the caller; and a datastore interaction code module adapted to access information in the datastore and populate the cache memory module with a copy of the configuration information from the datastore, wherein the data table object interface module obviates the need for the caller to directly access the datastore.

11. A data table object interface module as defined in claim 10 further comprising interfaces which expose a standardized command set exploitable by the caller to access the configuration information within the cache memory.

12. A data table object interface module as defined in claim 11 wherein the configuration information is stored in tabular form in the cache memory.

13. A data table object interface module as defined in claim 10 wherein the data table object interface module encapsulates the data in the datastore from the caller.

14. A data table object interface module as defined in claim 13 wherein the configuration information in the datastore is accessible to the caller only through the data table object interface module.

15. A data table object interface module as defined in claim 12 wherein the caller is provided with a cursor to the configuration information located in the cache memory.

16. A data table object interface module as defined in claim 10 wherein the caller requests the configuration information using a type-independent request and the datastore interaction code module converts the configuration information into recognizable form for the caller.

17. A computer readable medium having computer-executable components to provide access to configuration information located in a datastore to a caller, said components comprising:

a creation component that creates a data table object for a datastore;

an allocation component that allocates cache memory that is accessible by the data table object, wherein the cache memory is adapted to store a copy of the configuration information; and a datastore interaction component that enables communication between the datastore and the data table object, obviating the need for the caller to directly access the configuration information in the datastore.

18. A computer readable medium as defined in claim 17 wherein the data table object is bound to one datastore.

19. A computer readable medium as defined in claim 18 wherein the data table object provides configuration information to the caller in response to a type independent request for information.

20. A computer readable medium as defined in claim 19 wherein the data table object stores configuration information in the cache memory, and provides the caller with a pointer into the cache memory.

21. A computer readable medium as defined in claim 20 wherein the data table object exposes a standardized set of methods.

22. A computer readable medium as defined in claim 21 wherein the data table object comprises a read cache and a write cache.

23. A computer readable medium as defined in claim 22 wherein the write cache is separate from the read cache.

24. A computer readable medium having computer-executable components to provide access to configuration information located in a datastore to a caller, said components comprising:

a creation component that creates a data table object interface for a datastore, wherein the data table object is bound to one datastore;

an allocation component that allocates cache memory that is accessible by the data table object; and a datastore interaction component that enables communication between the datastore and the data table object; and wherein the datastore interaction code component is modifiable to be bound to a second datastore, wherein the second datastore is different from the first aforementioned datastore, wherein the datastore interaction code is bound to only one of the first and second datastores.

25. A data table object interface module as defined in claim 10 wherein the cache memory module comprises a read and write cache.

26. A data table object interface module as defined in claim 25 wherein the write cache is separate from the read cache.

* * * * *